(12) United States Patent
Claunch

(10) Patent No.: US 6,746,249 B1
(45) Date of Patent: Jun. 8, 2004

(54) EDUCATIONAL SYSTEM FOR TEACHING SHOE-TYING SKILLS

(76) Inventor: P. Stephen Claunch, 260 Goodwin Crest, Suite 322, Birmingham, AL (US) 35209

( * ) Notice: Subject to any disclaimer, the term of this patent is extended or adjusted under 35 U.S.C. 154(b) by 0 days.

(21) Appl. No.: 10/633,755

(22) Filed: Aug. 4, 2003

(51) Int. Cl.[7] ............................................. G09B 19/24
(52) U.S. Cl. .................................................... 434/260
(58) Field of Search ................................ 434/258, 259, 434/260; 24/712

(56) References Cited

U.S. PATENT DOCUMENTS

| | | | |
|---|---|---|---|
| 2,646,630 A | * 7/1953 | Barlow | 434/260 |
| 2,991,561 A | * 7/1961 | Moore et al. | 434/259 |
| 3,258,858 A | * 7/1966 | Cariffe, Jr. | 36/1 |
| 3,473,198 A | 10/1969 | Meier | |
| 4,017,984 A | * 4/1977 | Bonfigli | 434/260 |
| 4,597,198 A | 7/1986 | Schweitzer | |
| 4,646,350 A | 2/1987 | Batra | |
| 4,712,319 A | 12/1987 | Goria | |
| 4,771,556 A | 9/1988 | Kim | |
| 5,110,296 A | * 5/1992 | Cohen | 434/260 |
| 5,240,418 A | * 8/1993 | Silverman et al. | 434/260 |
| 5,269,690 A | * 12/1993 | Zigon | 434/397 |
| 5,562,457 A | * 10/1996 | Haslam | 434/260 |
| 5,611,692 A | * 3/1997 | Gehrdes | 434/260 |
| 5,639,244 A | * 6/1997 | Stricklin | 434/260 |
| 5,858,914 A | 1/1999 | Shibahashi et al. | |
| 6,382,981 B1 | * 5/2002 | Stanfield | 434/260 |

* cited by examiner

Primary Examiner—Kurt Fernstrom
(74) Attorney, Agent, or Firm—Donald R. Schoonover

(57) ABSTRACT

An educational system uses bi-colored shoe laces on specially marked shoes along with an instructional video to teach manipulative skills required to tie shoes.

1 Claim, 1 Drawing Sheet

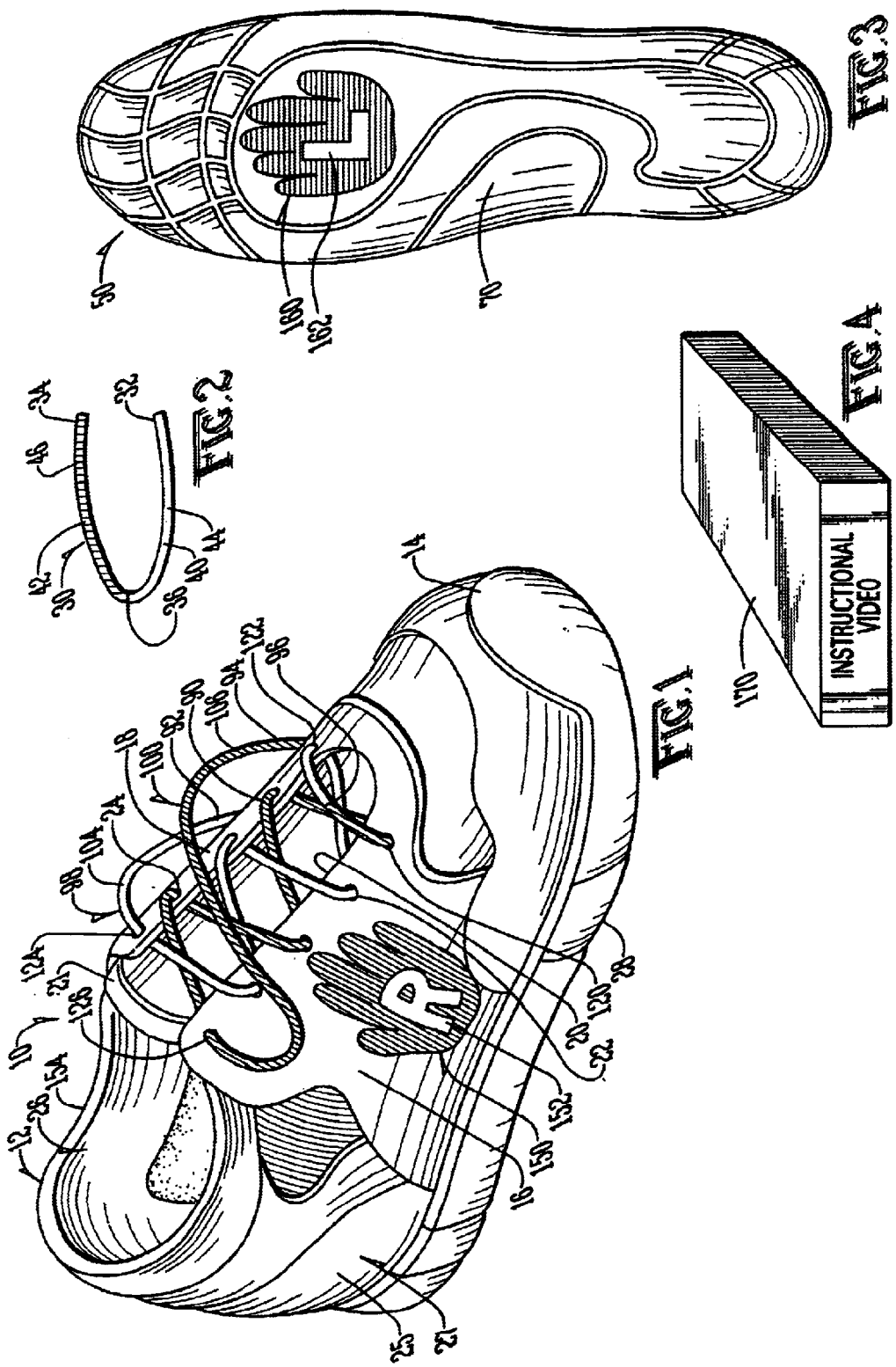

EDUCATIONAL SYSTEM FOR TEACHING SHOE-TYING SKILLS

BACKGROUND OF THE INVENTION

1. Field of the Invention

The present invention relates to the general art of education and demonstration, and to the particular field of teaching manipulative skills.

2. Discussion of the Related Art

Tying shoes is a difficult and frustrating skill for a young child to learn. Teaching a child to tie his or her shoes is often a difficult and frustrating time for a teacher. For these reasons, many children's shoes are not tie-type shoes or have snaps or the like on them.

However, tying their shoes is a very important skill for a child to learn. Not only is the skill, itself, important, the dexterity learned is very important. Furthermore, the boost in self-image gained from learning such a difficult and complex skill is also very valuable. Therefore, children need to learn to tie their shoes.

Therefore, there is a need for an educational system for teaching a person, such as a child, how to tie their shoes.

Any system used to teach a child to tie their shoes should be appealing as well as effective. If the system is appealing, the child will be encouraged to attempt and practice the skill. Furthermore, if the system is appealing, the final result, i.e., a tied shoe, will be appealing both aesthetically and psychologically. Every time the child notes his or her tied shoes, that child will receive positive reinforcement. If the system is visually and aesthetically appealing, the positive reinforcement will be enhanced.

Therefore, there is a need for an educational system for teaching a person, such as a child, how to tie their shoes that is visually appealing.

If the tied shoes are visually distinctive, the child's attention will be drawn to the tied shoes. His or her friends will also notice the tied shoes. This will enhance the positive effects of the educational system.

Therefore, there is a need for an educational system for teaching a person, such as a child, how to tie their shoes that is visually distinctive.

The positive results obtained by actually doing a task to learn and practice the task are much greater than if the learning or practice is simulated. Thus, to learn to tie one's shoes, it is best and most effective if the learning is done on an actual shoe that is actually on the learner's foot as opposed to a model that may be resting on a desk or the like. It is different tying a shoe that is on the learner's foot than tying a model that is resting in front of the learner because, among other things, the view and perspective of the actual shoe on the learner's foot will be far different from the view and perspective of a model that is not on the learner's foot.

Therefore, there is a need for an educational system for teaching a person, such as a child, how to tie their shoes that uses a shoe that is actually being worn by the learner.

PRINCIPAL OBJECTS OF THE INVENTION

It is a main object of the present invention to provide an educational system for teaching a person, such as a child, how to tie their shoes.

It is another object of the present invention to provide an educational system for teaching a person, such as a child, how to tie their shoes that is visually appealing.

It is another object of the present invention to provide an educational system for teaching a person, such as a child, how to tie their shoes that is visually distinctive.

It is another object of the present invention to provide an educational system for teaching a person, such as a child, how to tie their shoes that uses a shoe that is actually being worn by the learner.

SUMMARY OF THE INVENTION

These, and other, objects are achieved by an educational system that includes bi-colored laces that fit through the eyelets on tie-type shoes so that one of the colors is located on the right side of both shoes and the other color is located on the left side of both shoes when the laces are threaded through the eyelets of the shoes. A right hand marker is located on the right shoe of the shoes and has a shape of a right hand and has the color of the bi-colored laces that is located on the right hand side of the shoes. A left hand marker is located on the bottom of the outsole of the left shoe and has the color of the bi-colored laces that is located on the left hand side of the shoes. The quarter panels of each shoe also have colors thereon that match the right hand and left hand colors of the laces and the colors of the markers to further reinforce the right hand/left hand aspects of the educational system of the present invention as well as to further reinforce the shoe lace-tying lessons associated with the educational system of the present invention.

The system of the present invention makes the shoes distinctive and attractive when the shoes are worn. Every time a child looks at his or her shoes, he or she will be reminded that he or she tied his or her own shoes thereby providing positive reinforcement for the child. The colors of the system are distinctive and attractive so the shoes will be aesthetically pleasing for the child. Also, every time the child looks at the shoes, he or she will be reminded of which shoe is the left shoe and which shoe is the right shoe, again providing reinforcement for the learning process.

The system of the present invention also includes an instructional video so the child can learn at his or her own pace and convenience.

Since the learner is learning on a shoe that is actually being worn by the learner, the learning process teaches actual and practical knowledge and the learning is done from the perspective of an actual operation. Simulations are not as effective in this process as are actual situations. There is not as much self-satisfaction in successfully tying a simulated shoe as there is in successfully tying a shoe that is actually being worn at the time the shoe is tied. Even after a person learns to tie a simulated model, the person still has more learning to do to translate that learned process into a practical application of tying a shoe that is actually on the learner's foot. The system embodying the present invention makes this last step of translating learned knowledge into practical applications superfluous and is thereby much more efficient.

BRIEF DESCRIPTION OF THE DRAWING FIGURES

FIG. 1 is a perspective view of a right shoe used in the educational system embodying the present invention.

FIG. 2 is a bottom view of a left shoe used in the educational system embodying the present invention.

FIG. 3 shows a bi-colored shoe lace used in the educational system embodying the present invention.

FIG. 4 is a perspective view of a video used in the educational system embodying the present invention.

DETAILED DESCRIPTION OF THE PREFERRED EMBODIMENT

Other objects, features and advantages of the invention will become apparent from a consideration of the following detailed description and the accompanying drawings.

Referring to the figures, it can be understood that the present invention is embodied in an educational system 10 for teaching a person how to tie shoes. System 10 allows the person to learn and practice on actual shoes as opposed to learning or practicing on some model. The system embodied in the present invention will provide a tied shoe that will positively reinforce the child for his or her efforts and achievements thus enhancing the overall results associated with the educational system.

Educational system 10 comprises a right foot tie-type shoe 12 which has a toe box 14, a right side flap 16, and a left side flap 18. The right side flap 16 of the right foot tie-type shoe 12 is spaced apart from the left side flap 18 of the right foot tie-type shoe 12 and defines an opening 20 between the right side flap 16 of the right foot tie-type shoe 12 and the left side flap 18 of the right foot tie-type shoe 12, and a tongue 21 is located between the right side flap 16 and the left side flap 18 and spans opening 20. A plurality of right-side eyelets, such as eyelet 22, are defined through the right side flap 16 of the right foot tie-type shoe 12 adjacent to the opening 20 of the right foot tie-type shoe 12. A plurality of left side eyelets, such as eyelet 24, are defined through the left side flap 18 of the right foot tie-type shoe 12 adjacent to the opening 20 of the right foot tie-type shoe 12.

The right foot tie-type shoe 12 further includes a heel 25, a left side quarter panel 26 extending between the left side flap 18 of the right foot tie-type shoe 12 and the heel 25 of the right foot tie-type shoe 12 and a right side quarter panel 27 extending between the right side flap 16 of the right foot tie-type shoe 12 and the heel 25 of the right foot tie-type shoe 12. While only the right side quarter panel 27 is shown in FIG. 1, those skilled in the art will understand that the left side quarter panel 26 is substantially identical to, but a mirror image of, the right side quarter panel 27.

An outsole 28 is located on the bottom of the right foot tie-type shoe 12 when the right foot tie-type shoe 12 is worn. The right foot tie-type shoe 12 is located on the right foot of a wearer when in use.

A left foot tie lace 30 is accommodated in all of the eyelets of a left foot tie-type shoe 50. The left foot tie lace 30 is one-piece and monolithic and is also shown in FIG. 2. Left foot tie lace 30 has a first end 32, a second end 34 and a midpoint 36 located midway between the first end 32 of the left foot tie lace 30 and the second end 34 of the left foot tie lace 30. A left hand portion 40 of the left foot tie lace 30 extends between the first end 32 of the left foot tie lace 30 and the midpoint 36 of the left foot tie lace 30. A right hand portion 42 of the left foot tie lace 30 extends between the second end 34 of the left foot tie lace 30 and the midpoint 36 of the left foot tie lace 30. A left hand color, such as blue 44, is on the left hand portion 40 of the left foot tie lace 30 between the first end 32 of the left foot tie lace 30 and the midpoint 36 of the left foot tie lace 30. A right hand color, such as red 46, is on the right hand portion 42 of the left foot tie lace 30 between the second end 34 of the left foot tie lace 30 and the midpoint 36 of the left foot tie lace 30.

System 10 includes the left foot tie-type shoe 50 that is identical to, but a mirror image of, the just-described right foot tie-type shoe 12. Left foot tie-type shoe 50 is shown in FIG. 3. FIG. 3 shows the bottom of shoe 50 for reasons of completeness of disclosure as well as for reasons that will be understood from the following discussion. For the sake of completeness, the left foot tie-type shoe 50 will be described, but no reference numbers will be cited as the elements that will now be described are fully disclosed for the right foot tie-type shoe 12 just described.

Left foot tie-type shoe 50 includes a toe box, a right side flap and a left side flap. The right side flap is spaced apart from the left side flap and defines an opening between the right side flap of the left foot tie-type shoe 50 and the left side flap of the left foot tie-type shoe 50, and a tongue is located between the right side flap and the left side flap of the left foot tie-type shoe 50 and spans the opening of the left foot tie-type shoe 50.

A plurality of right side eyelets are defined through the right side flap of the left foot tie-type shoe 50 adjacent to the opening of the left foot tie-type shoe 50 and a plurality of left side eyelets are defined through the left side flap of the left foot tie-type shoe 50 adjacent to the opening of the left foot tie-type shoe 50.

The left foot tie-type shoe 50 further includes a heel, a left side quarter panel extending between the left side flap of the left foot tie-type shoe 50 and the heel of the left foot tie-type shoe 50 and a right side quarter panel extending between the right side flap of the left foot tie-type shoe 50 and the heel of the left foot tie-type shoe 50.

An outsole 70 is located on the bottom of the left foot tie-type shoe 50 when the left foot tie-type shoe 50 is worn, and the left foot tie-type shoe 50 is located on the left foot of a wearer when in use.

As indicated in FIG. 1, a right foot tie lace 90 is accommodated in all of the eyelets 22, 24 of the right foot tie-type shoe 12. The right foot tie lace 90 is one-piece and monolithic to be strong and durable as well as to be easily manipulated in the manner of a regular shoe lace by a learner, especially a young child. Right foot tie lace 90 has a first end 92, a second end 94, and a midpoint 96 located midway between the first end 92 of the right foot tie lace 90 and the second end 94 of the right foot tie lace 90. A left hand portion 98 of the right foot tie lace 90 extends between first end 92 of the right foot tie lace 90 and the midpoint 96 of the right foot tie lace 90.

A right hand portion 100 of the right foot tie lace 90 extends between second end 94 of right foot tie lace 90 and the midpoint 96 of the right foot tie lace 90. A left hand color, such as blue 104, is located on the left hand portion 98 of the right foot tie lace 90 between the first end 92 of the right foot tie lace 90 and the midpoint 96 of the right foot tie lace 90. A right hand color, such as red 106, is located on the right hand portion 100 of the right foot tie lace 90 between the second end 94 of right foot tie lace 90 and the midpoint 96 of the right foot tie lace 90.

The left hand color 104 of the right foot tie lace 90 is identical to the left hand color 44 of the left foot tie lace 30 and the right hand color 106 of the right hand tie lace 90 is identical to the color of the right hand color 46 of the left hand tie lace 30.

As can be seen in FIG. 1, the right foot tie lace 90 is positioned in the eyelets 22, 24 of the right foot tie-type shoe 12 with the midpoint 96 of the right foot tie lace 90 located between and adjacent to the eyelet 120 of the right side flap 16 of the right foot tie-type shoe 12 which is closest to the toe box 14 of the right foot tie-type shoe 12 and the eyelet 122 of the left side flap 18 of the right foot tie-type shoe 12 which is closest to the toe box 14 of the right toot tie-type shoe 12. The left hand portion 98 of the right foot tie lace 90 extends through every other eyelet of the eyelets 22, 24 of the right foot tie-type shoe 12. The left hand portion 98 of the right foot tie lace 90 extends through eyelet 124 of the left side flap 18 of the right foot tie-type shoe 12 that is located farthest away from the toe box 14 of the right foot tie-type shoe 12 to be positioned on the left side of the right foot tie-type shoe 12 when the right foot tie-type shoe 12 is worn. The right hand portion 100 of the right foot tie lace 90 extends through all of the eyelets 22, 24 of the right foot tie-type shoe 12 which are not occupied by the left hand portion 98 of the right foot tie lace 90. The right hand portion 100 of the right foot tie lace 90 extends through eyelet 126 on the right side flap 16 of the right foot tie-type shoe 12 that is located farthest away from the toe box 14 of the right foot tie-type shoe 12 to be positioned on the right side of the right foot tie-type shoe 12 when the right foot tie-type shoe 12 is worn.

The left foot tie lace 30 is identically accommodated in the left foot tie-type shoe 50 as has been described with reference to the right foot tie-type shoe 12. Therefore, while this accommodation will be described, it will not be illustrated as those skilled in the art will be able to visualize the accommodation based on the description and teaching of the disclosure of FIG. 1.

The left foot tie lace 30 is positioned in the eyelets of the left foot tie-type shoe 50 with the midpoint of the left foot tie lace located between and adjacent to the eyelet of the right side flap of the left foot tie-type shoe 50 which is closest to the toe box of the left foot tie-type shoe 50 and the eyelet of the left side flap of the left foot tie-type shoe 50 which is closest to the toe box of the left toot tie-type shoe 50. The left hand portion of the left foot tie lace 30 extends through every other eyelet of the eyelets of the left foot tie-type shoe 50. The left hand portion 40 of the left foot tie lace 30 extends through the eyelet on the left side flap of the left foot tie-type shoe 50 that is located farthest away from the toe box of the left foot tie-type shoe 50 to be positioned on the left side of the left foot tie-type shoe 50 when the left foot tie-type shoe 50 is worn, and the right hand portion 42 of the left foot tie lace 30 extends through all of the eyelets of the left foot tie-type shoe 50 which are not occupied by the left hand portion 40 of the left foot tie lace 30. The right hand portion 42 of the left foot tie lace 30 extends through the eyelet on the right side flap of the left foot tie-type shoe 50 that is located farthest away from the toe box of the left foot tie-type shoe 50 to be positioned on the right side of the left foot tie-type shoe 50 when the left foot tie-type shoe 50 is worn.

A right hand marker 150 is located on the right side flap 16 of the right foot tie-type shoe 12 to be on the right side of the right foot tie-type shoe 12 when the right foot tie-type shoe 12 is worn. The right hand marker 150 has a color that is identical to the color of the right hand portion 100 of the right foot tie lace 90. The right hand marker 150 is in the shape of a right hand and includes an indicia 152 in the shape of an "R".

A right hand color 152 is located on the right side quarter panel 27 of the right foot tie-type shoe 12. The right hand color 152 of the right foot tie-type shoe 12 is identical to the color 106 of the right hand portion 100 of the right foot tie lace 90. A left hand color 154 is located on the left side quarter panel 26 of the right foot tie-type shoe 12. The left hand color 154 of the right foot tie-type shoe 12 is identical to the color 106 on the left hand portion 98 of the right foot tie lace 90.

A left hand marker 160 is on the outsole 70 of the left foot tie-type shoe 50. The left hand marker 160 has a color that is identical to the color 44 of the left hand portion 40 of the left foot tie lace 30. The left hand marker 160 is in the shape of a left hand and includes an indicia 162 in the shape of an "L". The location of the left hand marker 160 on the outsole 70 and the right hand marker 150 on the right side flap 16 emphasizes the difference between the shoes 12, 50 and helps reinforce the learning of the right hand/left hand differences.

A right hand color is located on right side quarter panel of the left foot tie-type shoe 50. The right hand color of the left foot tie-type shoe 50 is identical to the color of the right hand portion 42 of the left foot tie lace 30. A left hand color is located on the left side quarter panel of the left foot tie-type shoe 50. The left hand color of the left foot tie-type shoe 50 is identical to the color 44 on the left hand portion 40 of the left foot tie lace 30.

The colors on the quarter panels of the shoes further reinforces the right hand/left hand differences and shoe-tying learning skills of educational system 10.

In all respects, the left foot tie-type shoe 50 is identical to the right foot tie-type shoe shown in FIG. 1 with the exception of the outsoles. As will be understood from the foregoing discussion, the outsole 70 of the left foot tie-type shoe 50 is identical to, but a mirror image of, the outsole of the right foot tie-type shoe 12, but includes left hand marker 160 whereas the outsole of the right foot tie-type shoe 12 does not have such a marker.

An instructional video 170 shows how to tie shoes using the left foot tie lace 30 and the right foot tie lace 90 as well as the right hand marker 150 and the left hand marker 160.

It is to be understood that while certain forms of the present invention have been illustrated and described herein, it is not to be limited to the specific forms or arrangements of parts described and shown.

What is claimed and desired to be covered by Letters Patent is:

1. An educational system for teaching a person how to tie shoes comprising:
    a) a left foot tie-type shoe having
        (1) a toe box,
        (2) a right side flap,
        (3) a left side flap,
        (4) the right side flap being spaced apart from the left side flap and defining an opening between the right side flap and the left side flap,
        (5) a tongue located between the right side flap of said left foot tie-type shoe and the left side flap of said left foot tie-type shoe and spans the opening of said left foot tie-type shoe,
        (6) a plurality of right side eyelets defined through the right side flap of said left foot tie-type shoe adjacent to the opening of said left foot tie-type shoe,
        (7) a plurality of left side eyelets defined through the left side flap of said left foot tie-type shoe adjacent to the opening of said left foot tie-type shoe,
        (8) an outsole which is located on the bottom of said left foot tie-type shoe when said left foot tie-type shoe is worn,
        (9) a heel,
        (10) a left side quarter panel extending between the left side flap of said left foot tie-type shoe and the heel of said left foot tie-type shoe,
        (11) a right side quarter panel extending between the right side flap of said left foot tie-type shoe and the heel of said left foot tie-type shoe, and
        (12) said left foot tie-type shoe being located on the left foot of a wearer when in use;

b) a right foot tie-type shoe having
  (1) a toe box,
  (2) a right side flap,
  (3) a left side flap,
  (4) the right side flap of said right foot tie-type shoe being spaced apart from the left side flap of said right foot tie-type shoe and defining an opening between the right side flap of said right foot tie-type shoe and the left side flap of said right foot tie-type shoe,
  (5) a tongue located between the right side flap of said right foot tie-type shoe and the left side flap of said right foot tie-type shoe and spans the opening of said right foot tie-type shoe,
  (6) a plurality of right side eyelets defined through the right side flap of said right foot tie-type shoe adjacent to the opening of said right foot tie-type shoe,
  (7) a plurality of left side eyelets defined through the left side flap of said right foot tie-type shoe adjacent to the opening of said right foot tie-type shoe,
  (8) an outsole which is located on the bottom of said right foot tie-type shoe when said right foot tie-type shoe is worn,
  (9) a heel,
  (10) a left side quarter panel extending between the left side flap of said right foot tie-type shoe and the heel of said right foot tie-type shoe,
  (11) a right side quarter panel extending between the right side flap of said right foot tie-type shoe and the heel of said right foot tie-type shoe, and
  (12) said right foot tie-type shoe being located on the right foot of a wearer when in use;
c) a left foot tie lace accommodated in all of the eyelets of said left foot tie-type shoe, said left foot tie lace being one-piece and monolithic and having
  (1) a first end,
  (2) a second end,
  (3) a midpoint located midway between the first end of said left foot tie lace and the second end of said left foot tie lace,
  (4) a left hand portion of said left foot tie lace extending between the first end of said left foot tie lace and the midpoint of said left foot tie lace,
  (5) a right hand portion of said left foot tie lace extending between the second end of said left foot tie lace and the midpoint of said left foot tie lace,
  (6) a left hand color on the left hand portion of said left foot tie lace between the first end of said left foot tie lace and the midpoint of said left foot tie lace,
  (7) a right hand color on the right hand portion of said left foot tie lace between the second end of said left foot tie lace and the midpoint of said left foot tie lace, and
  (8) the left hand color being different from the right hand color;
d) a right foot tie lace accommodated in all of the eyelets of said right foot tie-type shoe, said right foot tie lace being one-piece and monolithic and having
  (1) a first end,
  (2) a second end,
  (3) a midpoint located midway between the first end of said right foot tie lace and the second end of said right foot tie lace,
  (4) a left hand portion of said right foot tie lace extending between the first end of said right foot tie lace and the midpoint of said right foot tie lace,
  (5) a right hand portion of said right foot tie lace extending between the second end of said right left foot tie lace and the midpoint of said right foot tie lace,
  (6) a left hand color on the left hand portion of said right foot tie lace between the first end of said right foot tie lace and the midpoint of said right foot tie lace,
  (7) a right hand color on the right hand portion of said right foot tie lace between the second end of right left foot tie lace and the midpoint of said right foot tie lace, and
  (8) the left hand color of said right foot tie lace being identical to the left hand color of said left foot tie lace and being different from the right hand color of said right hand tie lace, the right hand color of said right hand tie lace being identical to the color of the right hand color of said left hand tie lace;
e) said left foot tie lace being positioned in the eyelets of said left foot tie-type shoe with the midpoint of said left foot tie lace being located between and adjacent to the eyelet of the right side flap of said left foot tie-type shoe which is closest to the toe box of said left foot tie-type shoe and the eyelet of the left side flap of said left foot tie-type shoe which is closest to the toe box of said left toot tie-type shoe, the left hand portion of said left foot tie lace extending through every other eyelet of the eyelets of said left foot tie-type shoe, the left hand portion of said left foot tie lace extending through the eyelet on the left side flap of said left foot tie-type shoe that is located farthest away from the toe box of said left foot tie-type shoe to be positioned on the left side of said left foot tie-type shoe when said left foot tie-type shoe is worn, and the right hand portion of said left foot tie lace extending through all of the eyelets of said left foot tie-type shoe which are not occupied by the left hand portion of said left foot tie lace, the right hand portion of said left foot tie lace extending through the eyelet on the right side flap of said left foot tie-type shoe that is located farthest away from the toe box of said left foot tie-type shoe to be positioned on the right side of said left foot tie-type shoe when said left foot tie-type shoe is worn;
f) said right foot tie lace being positioned in the eyelets of said right foot tie-type shoe with the midpoint of said right foot tie lace being located between and adjacent to the eyelet of the right side flap of said right foot tie-type shoe which is closest to the toe box of said right foot tie-type shoe and the eyelet of the left side flap of said right foot tie-type shoe which is closest to the toe box of said right foot tie-type shoe, the left hand portion of said right foot tie lace extending through every other eyelet of the eyelets of said right foot tie-type shoe, the left hand portion of said right foot tie lace extending through the eyelet on the left side flap of said right foot tie-type shoe that is located farthest away from the toe box of said right foot tie-type shoe to be positioned on the left side of said right foot tie-type shoe when said right foot tie-type shoe is worn, and the right hand portion of said right foot tie lace extending through all of the eyelets of said right foot tie-type shoe which are not occupied by the left hand portion of said right foot tie lace, the right hand portion of said right foot tie lace extending through the eyelet on the right side flap of said right foot tie-type shoe that is located farthest away from the toe box of said right foot tie-type shoe to be positioned on the right side of said right foot tie-type shoe when said right foot tie-type shoe is worn;
g) a right hand marker on the right side flap of said right foot tie-type shoe to be on the right side of said right foot tie-type shoe when said right foot tie-type shoe is worn, said right hand marker having a color that is identical to the color of the right hand portion of said right foot tie lace, said right hand marker being in the shape of a right hand and including an indicia in the shape of an "R";

h) a left hand marker on the outsole of said left foot tie-type shoe, said left hand marker having a color that is identical to the color of the left hand portion of said left foot tie lace, said left hand marker being in the shape of a left hand and including an indicia in the shape of an "L";

i) a right hand color on the right side quarter panel of said right foot tie-type shoe, the right hand color of said right foot tie-type shoe being identical to the color of the right hand portion of said right foot tie lace;

j) a left hand color on the left side quarter panel of said right foot tie-type shoe, the left hand color of said right foot tie-type shoe being identical to the color on the left hand portion of said right foot tie lace;

k) a right hand color on the right side quarter panel of said left foot tie-type shoe, the right hand color of said left foot tie-type shoe being identical to the color of the right hand portion of said left foot tie lace;

l) a left hand color on the left side quarter panel of said left foot tie-type shoe, the left hand color on said left foot tie-type shoe being identical to the color on the left hand portion of said left foot tie lace; and m) an instructional video showing how to tie shoes using said left foot tie lace and said right foot tie lace as well as said right hand marker and said left hand marker.

* * * * *